(12) United States Patent
Song et al.

(10) Patent No.: US 11,799,371 B2
(45) Date of Patent: Oct. 24, 2023

(54) AUTOMOTIVE POWER CONVERTER WITH RAIL-POWERED CLAMPING CIRCUITRY

(71) Applicant: Ford Global Technologies, LLC, Dearborn, MI (US)

(72) Inventors: Yantao Song, Northville, MI (US); Baoming Ge, Okemos, MI (US); Lihua Chen, Farmington Hills, MI (US); Fan Xu, Novi, MI (US); Serdar Hakki Yonak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

(21) Appl. No.: 16/547,284

(22) Filed: Aug. 21, 2019

(65) Prior Publication Data
US 2021/0057978 A1 Feb. 25, 2021

(51) Int. Cl.
*H02P 27/06* (2006.01)
*H02M 1/08* (2006.01)
*H02M 7/5387* (2007.01)
*B60L 15/04* (2006.01)
*B60L 50/50* (2019.01)
*H02M 3/158* (2006.01)

(52) U.S. Cl.
CPC .............. *H02M 1/08* (2013.01); *B60L 15/04* (2013.01); *B60L 50/50* (2019.02); *H02M 7/53871* (2013.01); *H02P 27/06* (2013.01); *B60L 2210/10* (2013.01); *B60L 2210/40* (2013.01); *H02M 3/158* (2013.01)

(58) Field of Classification Search
CPC ....... H02P 27/05; H02P 27/06; H02P 29/0241
See application file for complete search history.

(56) References Cited

U.S. PATENT DOCUMENTS

| | | | | |
|---|---|---|---|---|
| 8,493,018 | B2 * | 7/2013 | Kroeze | H02P 27/06 318/503 |
| 8,760,898 | B2 * | 6/2014 | Kroeze | H02M 7/487 363/132 |
| 8,937,823 | B2 * | 1/2015 | Jones | H03K 17/0812 363/56.02 |
| 9,035,687 | B2 * | 5/2015 | Roewe | H03K 17/165 327/309 |
| 9,640,972 | B2 * | 5/2017 | Kreuter | H03K 17/082 |

(Continued)

OTHER PUBLICATIONS

Infineon, "Half-Bridge Driver With Overcurrent Protection", www.infineon.com, Mar. 2, 2017, 26 pgs.

(Continued)

*Primary Examiner* — Rina I Duda
(74) *Attorney, Agent, or Firm* — David B. Kelley; Brooks Kushman P.C.

(57) ABSTRACT

A power converter has a pair of series connected switches defining a phase leg, a pair of gate driver circuits that respectively provide power to gates of the series connected switches, a positive rail electrically connected with the phase leg, and a clamping circuit including a clamping switch. The clamping circuit, responsive to one of the gate driver circuits being de-energized, activates the clamping switch with energy from the positive rail to clamp a gate of one of the series connected switches associated with the one of the gate driver circuits to another terminal of the one of the series connected switches.

17 Claims, 4 Drawing Sheets

(56) References Cited

U.S. PATENT DOCUMENTS

| | | | | |
|---|---|---|---|---|
| 9,813,009 | B1* | 11/2017 | Xu | H03K 17/165 |
| 2013/0265095 | A1* | 10/2013 | Mazzola | H02M 1/08 |
| | | | | 327/379 |
| 2015/0097613 | A1* | 4/2015 | Roewe | H03K 17/165 |
| | | | | 327/382 |
| 2018/0159440 | A1* | 6/2018 | Xu | H02M 1/32 |
| 2019/0052167 | A1 | 2/2019 | Escudero Rodriguez et al. | |

OTHER PUBLICATIONS

Toshiba, "Power MOSFET Selecting MOSFFETS and Consideration for Circuit Design", Toshiba Electronic Devices & Storage Corporation, Jul. 26, 2018, 18 pgs.

* cited by examiner ately power converter with
rail-powered clamping circuitry

AUTOMOTIVE POWER CONVERTER WITH RAIL-POWERED CLAMPING CIRCUITRY

TECHNICAL FIELD

This disclosure relates to automotive power converters and the control thereof to prevent dual-on conditions.

BACKGROUND

A hybrid electric vehicle may combine a conventional internal combustion engine system with an electric propulsion system. Presence of the electric powertrain is intended to achieve better fuel economy than a conventional vehicle or better performance. There are a variety of hybrid electric vehicle types, and the degree to which each functions as an electric vehicle may vary. A common form of hybrid electric vehicle is the hybrid electric car, although hybrid electric trucks (pickups and tractors) and buses also exist.

Modern hybrid electric vehicles make use of efficiency-improving technologies such as regenerative brakes which convert the vehicle's kinetic energy to electric energy for storage and later use. Some hybrid electric vehicles use an internal combustion engine to turn an electric generator, which either recharges the vehicle's batteries or directly powers its electric drive motors. Some hybrid electric vehicles reduce idle emissions by shutting down the engine at idle and restarting it when needed.

An electric vehicle uses one or more electric motors or traction motors for propulsion. An electric vehicle may be powered through a collector system by electricity from off-vehicle sources, or may be self-contained with a battery, solar panels, or an electric generator to convert filet to electricity. Electric vehicles include, but are not limited to, road and rail vehicles, surface and underwater vessels, electric aircraft and electric spacecraft.

SUMMARY

An electric drive system has an electric machine, a traction battery, and a power converter. The power converter transfers power between the electric machine and traction battery. The power converter includes a pair of series connected switches defining a phase leg, a pair of gate driver circuits configured to respectively provide power to gates of the series connected switches, a DC-link capacitor in parallel with the phase leg, a positive DC rail electrically connecting the DC-link capacitor and phase leg, and a clamping circuit including a clamping switch. The clamping circuit, responsive to one of the gate driver circuits being de-energized, activates the clamping switch with energy from the positive DC rail to clamp a gate of one of the series connected switches associated with the one of the gate driver circuits to another terminal of the one of the series connected switches to prevent the one of the series connected switches from achieving an ON state.

A power converter has a pair of series connected switches defining a phase leg, a pair of gate driver circuits that respectively provide power to gates of the series connected switches, a positive rail electrically connected with the phase leg, and a clamping circuit including a clamping switch. The clamping circuit, responsive to one of the gate driver circuits being de-energized, activates the clamping switch with energy from the positive rail to clamp a gate of one of the series connected switches associated with the one of the gate driver circuits to another terminal of the one of the series connected switches to prevent the one of the series connected switches from achieving an ON state.

A method for controlling a power converter includes, responsive to a gate driver circuit configured to power a gate of a switch of a phase leg of the power converter being de-energized, activating a clamping switch of a clamping circuit with energy from a positive rail of the power converter to clamp a gate of the switch to another terminal of the switch to prevent the switch from achieving an ON state.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
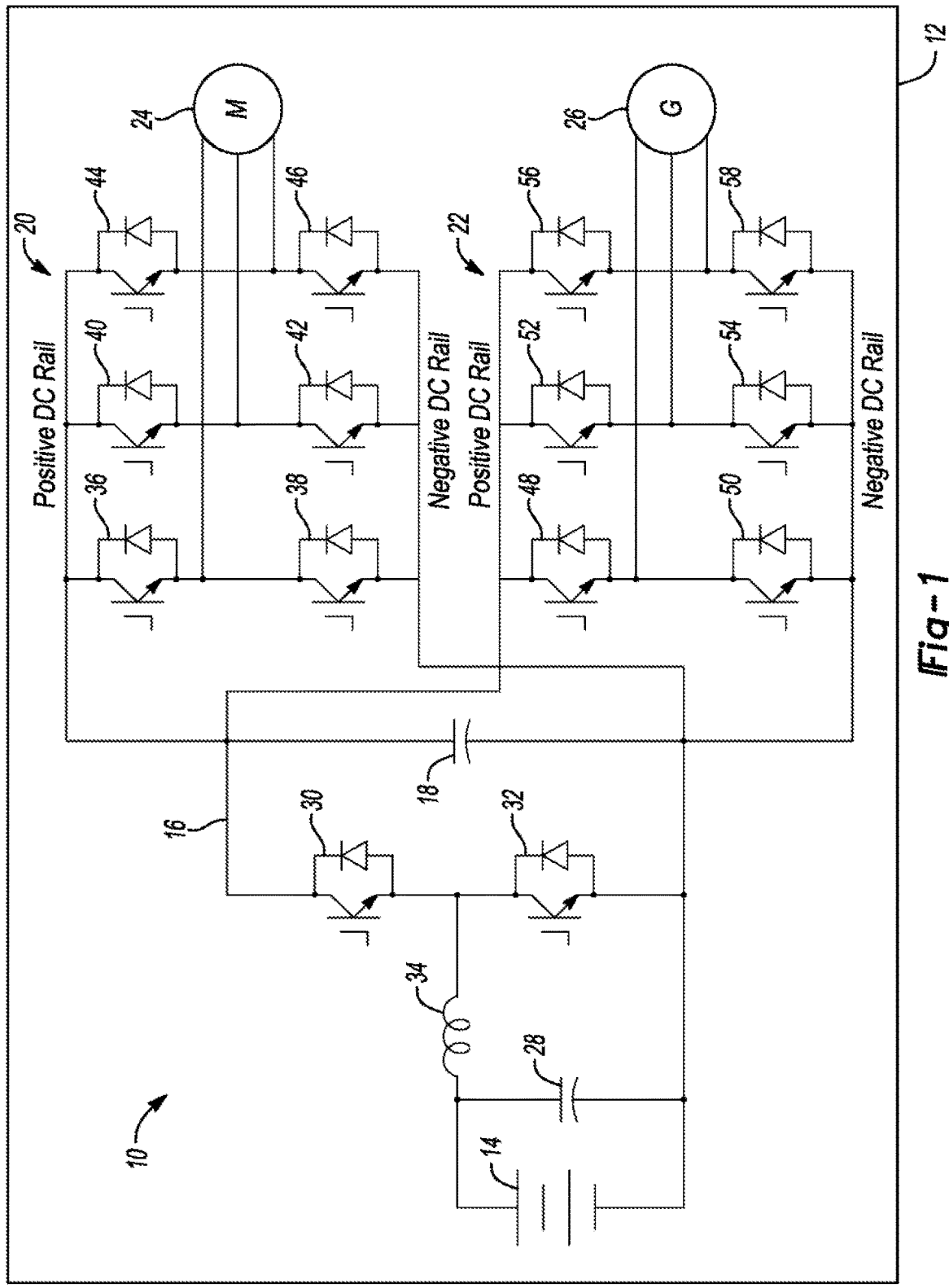
FIG. 1 is a schematic diagram of an electric drive system of a vehicle.

Bridge-based power electronics converters/inverters have been extensively used in hybrid electric vehicle and electric vehicle drive systems. As shown in FIG. 1, an electric drive system 10 for a vehicle 12 includes a traction battery 14, a bridge-based DC-DC converter 16, a DC-link capacitor 18 for DC bus 19, two power converters (DC-AC inverters) 20, 22, a motor 24, and a generator 26. The bridge-based DC-DC converter 16 includes a capacitor 28 in parallel with the traction battery 14, a pair of series connected switches 30, 32 (e.g., transistors), and an inductor 34 between the capacitor and series connected switches 30, 32.

The DC-AC inverter 20 includes, in this example, three pairs of series connected switches 36, 38, 40, 42, 44, 46. Each of the pairs defines a corresponding phase leg for the motor 24. The DC-AC inverter 26 also includes three pairs of series connected switches 48, 50, 52, 54, 56, 58. Each of the pairs defines a corresponding phase leg for the motor generator 26. The switches 36, 38, 40, 42, 44, 46, 48, 50, 52, 54, 56, 58 can be insulated gate bipolar transistors (IGBTs), metal oxide semiconductor field effect transistors (MOSFETs), or other controllable semiconductor devices. In the following examples, the switches 36, 38, 40, 42, 44, 46, 48, 50, 52, 54, 56, 58 are shown to be IGBTs.

A voltage associated with power from the traction battery 14 may be increased by operation of the bridge-based DC-DC converter 16 for eventual delivery to the DC-AC inverter 20 and thus the motor 24 to propel the vehicle 12. Likewise, regenerative power captured by the generator 26 may be passed through the DC-AC inverter 22 and so on for storage in the traction battery 14.

Dual-on conditions can occur across the phase legs of the DC-AC inverters 20, 22. Gate signals of the switches 36, 38, for example, are normally complementary. In normal operating conditions, only one of the switches 36, 38 is turned on at any time, in the dual-on condition, the switches 36, 38 are on at the same time, and the high DC voltage source is directly short circuited by the low impedance formed by the on-state resistances of the switches 36, 38. The dual-on condition can generate a large current that is much higher than the normal operating current of the switches 36, 38.

Figure 2:
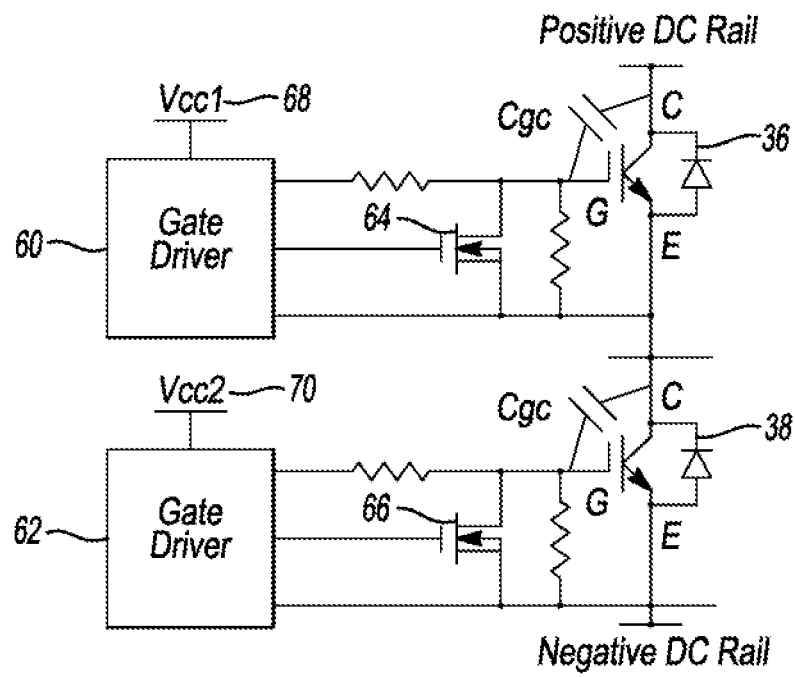
FIG. 2 is a schematic diagram of a phase leg of FIG. 1 and corresponding control circuitry.

FIG. 2 shows one of the phase legs of the DC-AC inverter 20 and its gate driver circuits 60, 62. The switches 36, 38 are the main power switches as implied above, and switches 64, 66 are miller-clamp switches. When the gate driver circuits 60, 62 are energized by power supplies 68, 70 respectively, the output status of the gate driver circuits 60, 62 is either high or low. When the switches 36, 38 are off, the clamping switches 64, 66 are turned on, and the gate G to emitter E of each of the switches 36, 38 is shorted by the low impedance of the switches 64, 66 respectively. Therefore, the switches 36, 38 are in the off state. (Several resistors are also shown in FIG. 2 and other figures. These are arranged in usual fashion and therefore need not be discussed in further detail.)

When the power supplies 68, 70 have no power however, the gate driver circuits 60, 62 and miller-clamping switches 64, 66 lose function. The outputs of the gate driver circuits 60, 62 are in a high-impedance state, and the miller-clamping switches 64, 66 are also in a high-impedance state. Therefore, the gate-to-emitter impedance of each of the switches 36, 38 is very high. If high voltage is applied to the DC bus 19 in this situation and the DC bus voltage fluctuates, current flowing through the parasitic capacitor Cgc of each of the switches 36, 38 will charge the gate capacitor of each of the switches 36, 38. If the DC bus voltage changes fast enough, the generated gate voltage by the charge current flowing through Cgc will cause the switches 36, 38 to turn on. If both of the switches 36, 38 are turned on, then a dual-on condition will occur as explained above.

Here, clamping circuits are proposed that prevent dual-on conditions of bridge-based converters and bridge-based inverters regardless of whether gate driver power supplies are energized.

Figure 3:
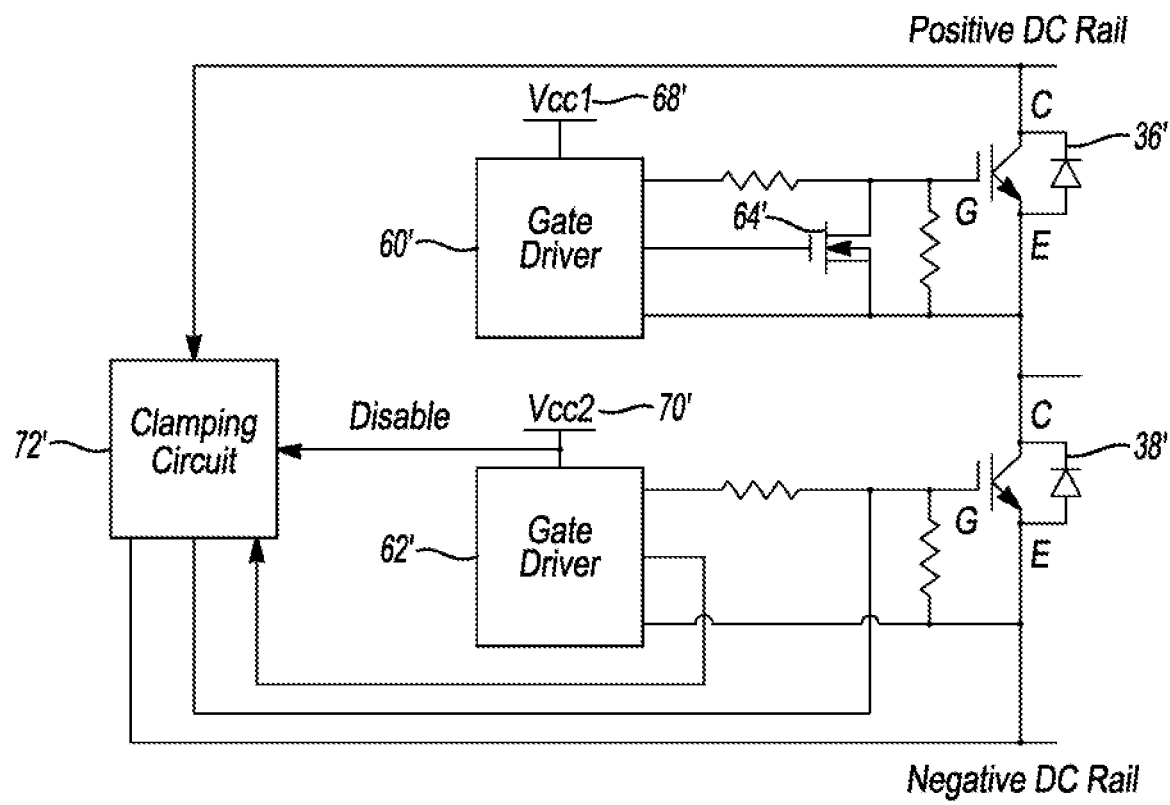
FIG. 3 is a schematic diagram of a phase leg and alternative corresponding control circuitry.

As shown in FIG. 3, when gate driver circuit 62' is not energized because power supply 70' is off or otherwise unavailable, and the DC bus (as represented by the positive DC rail) is energized, clamping circuit 72 will take energy from the DC bus and clamp the gate G of the switch 38' to its emitter E by low impedance, so that the switch 38' can be firmly off. Regardless of the ON/OFF status of the switch 36', no dual-on condition can occur. Note in this example arrangement, the switch 36' has a corresponding miller-clamping switch 64' associated with the gate driver circuit 60' and power supply 68' as in FIG. 2 but the switch 38' does not.

Once the gate driver circuit 62' is energized via power supply 70', control of the clamping circuit 72' will be taken over by the gate driver circuit 62', and the clamping circuit 72' will perform the same function as the switch 66 in FIG. 2. Therefore, the proposed clamping circuit 72' can effectively prevent the switch 38' from incorrectly turning on to avoid dual-on conditions of the phase leg when the gate driver circuits 60', 62' are not energized. Also, the proposed clamping circuit 72' keeps original function, which prevents the switch 38' from incorrectly turning on when the gate driver power supply 70' is in normal operation.

Figure 4:
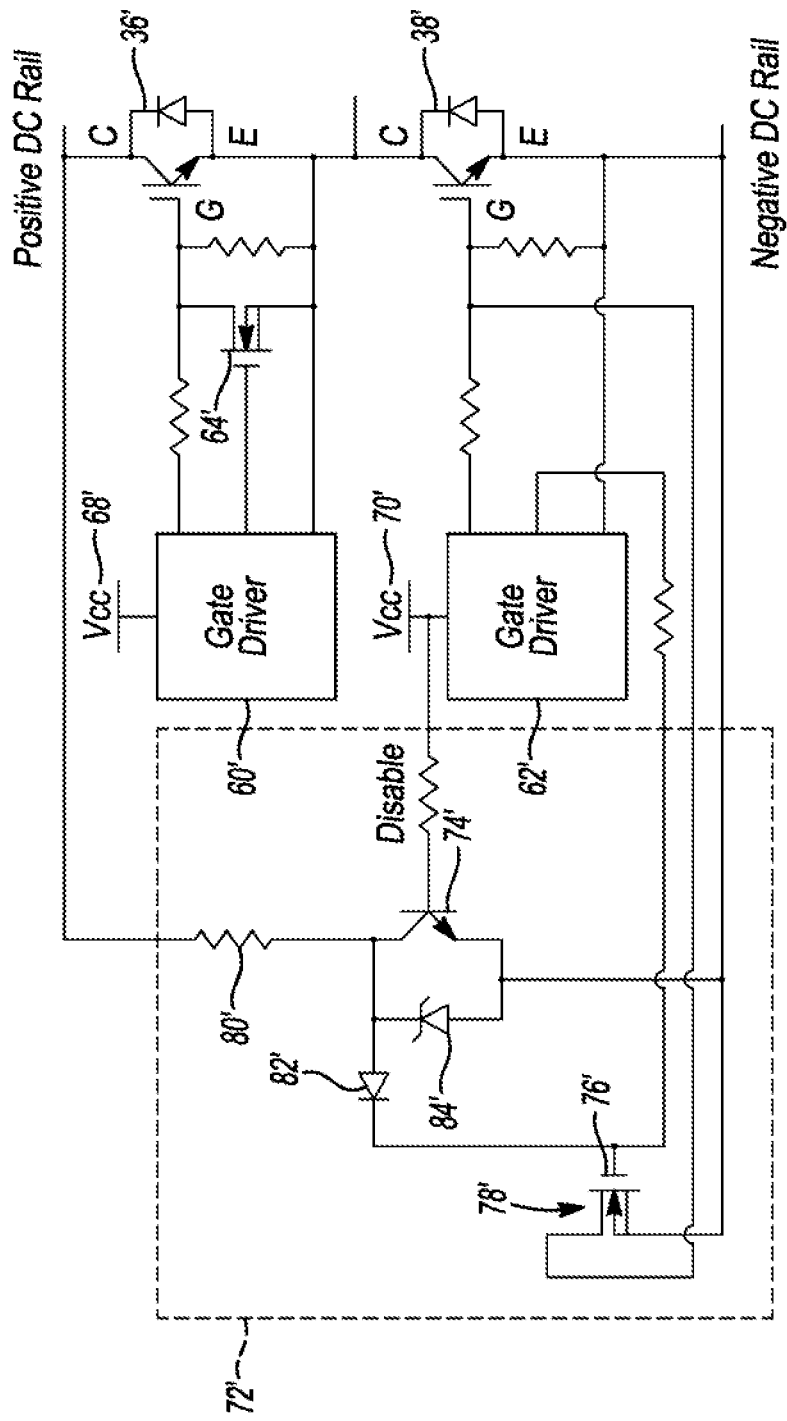
FIG. 4 is a schematic diagram of the clamping circuit of FIG. 3.

One implementation of the proposed clamping circuit 72' is shown in FIG. 4. Others, however, are also contemplated. When the gate driver circuit 62' is not energized and the DC bus (as represented by the positive DC rail) is energized, the transistor 74' is off, and gate 76' of switch 78' will be charged by energy from the DC bus through resistor 80' and diode 82'. Once the gate voltage of the switch 78' is sufficiently high, the switch 78' will be fully turned on and clamp the gate G of the switch 38' to its emitter E by low impedance. Therefore, the switch 38' can be firmly off. Zener diode 84', which is in parallel with the transistor 74', protects the gate voltage of the switch 78' over the rated voltage.

Once the gate driver circuit 62' is energized via power supply 70', the transistor 74' will be turned on, and the diode 82' will isolate the switch 78' from the DC bus positive rail. The gate driver circuit 62' will take over control of the switch 78' to function as a regular miller-clamping switch as generally described with reference to FIG. 2.

Figure 5:
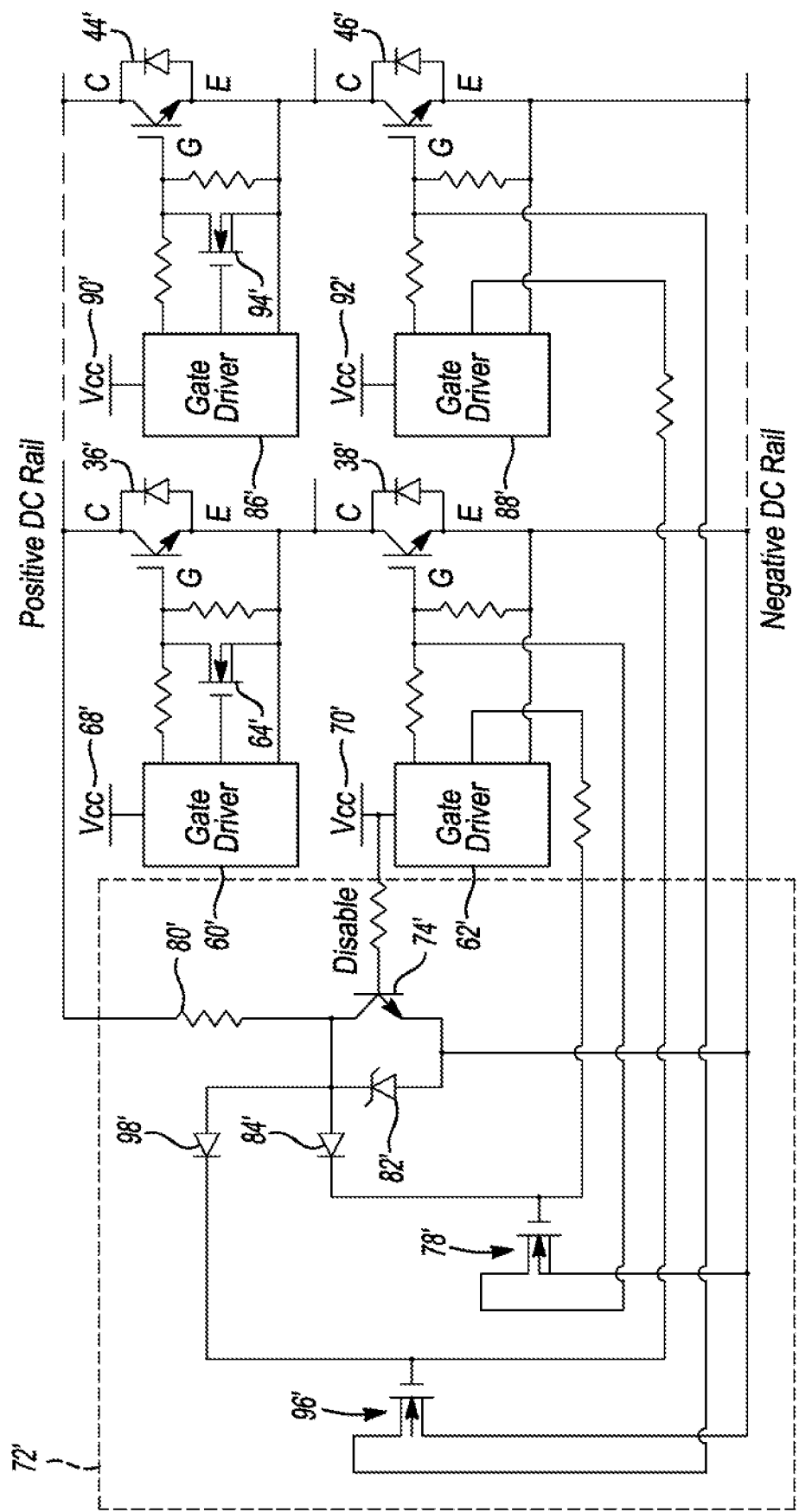
FIG. 5 is a schematic diagram of a clamping circuit arranged with multiple phase legs.

The proposed clamping circuit 72' can be extended to multiple phase legs. FIG. 5 shows an implementation of the proposed clamping circuit 72' shared by multiple phase legs in this arrangement, the additional phase leg is shown having switches 44', 46', gate driver circuits 86', 88', power supplies 90', 92', and switch 94' associated with the switch 44' and gate driver circuit 86'. Note again the switch 44' has a corresponding miller-clamping switch 94' but the switch 46' does not. Also, the power supplies 68', 90' operate together. The power supplies 68', 90' are either both on at the same time or both off at the same time. The same is true for the power supplies 70', 92'. In other configurations, the power supplies 68', 90' and 70', 92' may operate independent of each other. Each phase leg, however, may require its own clamping circuit. Other scenarios are also contemplated.

As above, when the gate driver circuits 62', 88' are not energized because the power supplies 70', 92' are off or otherwise unavailable, and the DC bus (as represented by the positive DC rail) is energized, the transistor 74' is off, and the gates of the switches 78', 96' will be charged with energy from the DC bus through the resistor 80' and diodes 84', 98' respectively. Once the gate voltages of the switches 78', 96' are sufficiently high, the switches 78', 96' will be fully timed on and clamp the gate G of the switch 38' to its emitter E by low impedance and clamp the gate G of the switch 46' to its emitter E by low impedance, thus precluding dual-on conditions on the phase legs illustrated.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The clamping circuits explicitly discussed, for example, include a transistor, a Zener diode, and a switch and diode for each phase leg. Other passive components can, of course, be used to implement the general functions of the clamping circuits, with such components being selected to best meet the operating and performance expectations for a given design.

The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric drive system comprising:
   an electric machine;
   a traction battery; and
   a power converter configured to transfer power between the electric machine and traction battery, and including a pair of series connected switches defining a phase leg, a pair of gate driver circuits configured to respectively provide power to gates of the series connected switches, a DC-link capacitor in parallel with the phase leg, a positive DC rail electrically connecting the DC-link capacitor and phase leg, and a clamping circuit directly connected to the positive DC rail and including a clamping switch, wherein the clamping circuit is configured to, responsive to one of the gate driver circuits being de-energized, activate the clamping switch with energy from the positive DC rail to clamp a gate of one of the series connected switches associated with the one of the gate driver circuits to another terminal of the one of the series connected switches to prevent the one of the series connected switches from achieving an ON state.

2. The electric drive system of claim 1, wherein the clamping circuit is further configured to, responsive to the one of the gate driver circuits being energized, isolate the clamping switch from the positive DC rail.

3. The electric drive system of claim 1, wherein the one of the gate driver circuits corresponding is further configured to power the clamping switch when energized.

4. The electric drive system of claim 1, wherein the power converter includes additional phase legs and wherein the clamping circuit includes one additional clamping switch for each of the additional phase legs.

5. The electric drive system of claim 4, wherein the clamping circuit is further configured to, responsive to the one of the gate driver circuits being de-energized, activate the additional clamping switches with energy from the positive DC rail.

6. The electric drive system of claim 1, wherein the power converter is a DC-AC inverter.

7. The electric drive system of claim 1, wherein the series connected switches are insulated gate bipolar transistors.

8. A power converter comprising:
   a pair of series connected switches defining a phase leg;
   a pair of gate driver circuits configured to respectively provide power to gates of the series connected switches;
   a positive rail electrically connected with the phase leg; and
   a clamping circuit directly connected to the positive rail and including a clamping switch, wherein the clamping circuit is configured to, responsive to one of the gate driver circuits being de-energized, activate the clamping switch with energy from the positive rail to clamp a gate of one of the series connected switches associated with the one of the gate driver circuits to another terminal of the one of the series connected switches to prevent the one of the series connected switches from achieving an ON state.

9. The power converter of claim 8, wherein the clamping circuit is further configured to, responsive to the one of the gate driver circuits being energized, isolate the clamping switch from the positive rail.

10. The power converter of claim 8, wherein the one of the gate driver circuits is further configured to power the clamping switch when energized.

11. The power converter of claim 8 further comprising additional phase legs, wherein the clamping circuit includes one additional clamping switch for each of the additional phase legs.

12. The power converter of claim 11, wherein the clamping circuit is further configured to, responsive to the one of the gate driver circuits being de-energized, activate the additional clamping switches with energy from the positive rail.

13. The power converter of claim 8, wherein the series connected switches are insulated gate bipolar transistors.

14. A method for controlling a power converter comprising:
   responsive to a gate driver circuit configured to power a gate of a switch of a phase leg of the power converter being de-energized, activating a clamping switch of a clamping circuit with energy from a positive rail of the power converter to clamp the gate of the switch to another terminal of the switch to prevent the switch from achieving an ON state, wherein the clamping circuit is directly connected to the positive rail.

15. The method of claim 14 further comprising responsive to the gate driver circuit being energized, isolating the clamping switch from the positive DC rail.

16. The method of claim 14 further comprising powering the clamping switch via the gate driver circuit when energized.

17. The method of claim 14, wherein the switch is an insulated gate bipolar transistor.

\* \* \* \* \*